United States Patent [19]
Coho

[11] 3,719,869
[45] March 6, 1973

[54] THRUST CONTROL FOR LINEAR MOTORS

[75] Inventor: Owen C. Coho, Erie, Pa.

[73] Assignee: General Electric Company, Erie, Pa.

[22] Filed: Jan. 3, 1972

[21] Appl. No.: 215,066

[52] U.S. Cl. .................................. 318/135, 310/13
[51] Int. Cl. ............................................. H02k 41/02
[58] Field of Search......318/135, 687, 121, 332, 227; 310/12–14

[56] References Cited

UNITED STATES PATENTS

| | | | |
|---|---|---|---|
| 3,582,737 | 6/1971 | Brown et al. | 318/227 |
| 3,577,929 | 5/1971 | Onoda et al. | 310/12 UX |
| 3,575,650 | 4/1971 | Fengler | 318/135 |
| 3,549,966 | 12/1970 | Wilson | 318/135 |
| 3,497,730 | 2/1970 | Doolittle | 310/13 |
| 3,462,883 | 8/1969 | Reek et al. | 318/135 |
| 3,257,597 | 6/1966 | Weiser | 318/332 |
| 2,666,879 | 1/1954 | Godsey, Jr. et al. | 318/135 |
| 2,404,964 | 7/1946 | Jones | 318/135 X |

Primary Examiner—D. F. Duggan
Attorney—Walter C. Bernkopf

[57] ABSTRACT

An apparatus and process for controlling the thrust of a linear induction motor as its speed is increased by sequentially energizing electrically decoupled stator sections and increasing the voltage applied to each by successively modulating each section with a single relatively small phase-controlled rectifier system.

6 Claims, 2 Drawing Figures

THRUST CONTROL FOR LINEAR MOTORS

BACKGROUND OF THE INVENTION

This invention relates generally to electric motor control systems and more particularly to thrust control of linear induction motors.

Near synchronous speed it is characteristic of induction motors for the torque to decrease as the motor speed is increased. This occurs since the speed of the rotor tends to approach the speed of the revolving field or the synchronous speed, thereby reducing the relative motion between the rotor and the field, and hence the induced current and the torque output. Conversely, the characteristic drive requirements of a particular load such as that of a fan or centrifugal pump, or the like, is such that the required torque increases in relation to the square of the speed. If this type of load is driven by an induction motor with the above discussed torque-speed characteristic, then to effect a stable speed control over the required speed range of the motor the torque-speed relationship must be altered. This can be accomplished merely by controlling the voltage. The torque produced can be represented by the equation T $V^2$. Voltage control can be accomplished in a number of ways, such as by transformer taps if step control is acceptable, but if smooth control over a wide speed range is desired, voltage control is better accomplished by such a system as that of using phase controlled rectifiers, wherein precise effective voltage adjustment is readily obtained by low power level control of rectifier firing circuits. This type of system is described in U.S. Pat. No. 3,582,737 issued to Herbert J. Brown and George M. Rosenberry Jr., on June 1, 1971, and assigned to the assignee of the present application.

Although the current capacity of the above mentioned control apparatus is much increased over previous arrangements there remains a requirement for high cost components having a current capacity of at least half of that current in the motor line. The requirement for controlling such power necessitates an array of solid state components whose expense may not be warranted by the particular motor application.

A scheme has been devised for a more economical control of the voltage applied to a motor power circuit wherein an AC power source is applied to a DC type motor system. This arrangement is described in U.S. Pat. No. 3,257,597 issued to Earnest F. Weiser on June 21, 1966, and assigned to the assignee of the present patent. It contemplates the use of an input transformer having a secondary formed of a number of secondary windings each of which represents a block of supply voltage which may be stepped into or out of the system. By controlling the voltage of one of these blocks, full regulation can be provided over essentially the full input voltage range while regulating only a portion of the supply voltage. This arrangement has proven satisfactory in an AC – DC system wherein the voltages produced by each of the secondary windings, when rectified, add to each other. However, such an arrangement of voltage stepping is not practical for providing power to AC motors.

It is therefore an object of this invention to provide an improved apparatus and method for controlling thrust of linear induction motors.

Another object of this invention is the provision for smooth control of voltage being applied to an induction motor operating over a wide speed range.

A further object of this invention is the provision for effectively and precisely controlling the thrust of an induction motor system with a minimum of expensive apparatus.

Yet another object of this invention is the provision for using phase controlled rectifier systems of considerably lesser current rating to control the voltage of a motor having a given current rating.

These objects and other features and advantages become more readily apparent upon reference to the following description when taken in conjunction with the appended drawings.

SUMMARY OF THE INVENTION

This invention contemplates the sequential energizing of a plurality of induction motor sections, and the corresponding sequential control of voltage being applied to each section, to increase the motor torque and speed to the desired level.

A single voltage control module is provided to regulate the voltage across one of the motor sections at a time, the control being provided by the low power level firing of controlled rectifiers. As each motor section is energized the control module is switched into the circuit therewith, and out of the circuit of the previously energized motor section, thereby providing an increasing total motor thrust while allowing for sequential voltage control of the individual sections. The current rating of the voltage control module need only be a fraction of the motor line current, that fraction being inversely proportion to the number of motor sections employed.

To increase effectiveness, the plurality of motor sections are preferably magnetically decoupled. Although this can be done with rotary induction motors, the present state of the art finds it difficult, expensive and impractical to do so. However, a linear induction motor adjusts itself well to this application since physical separation of the motor sections can be easily effected, thereby creating in effect a plurality of electrically independent small motors. The description of this preferred embodiment is thus directed to a system for use with a linear induction motor but is not necessarily limited to that particular application.

Figure 1:
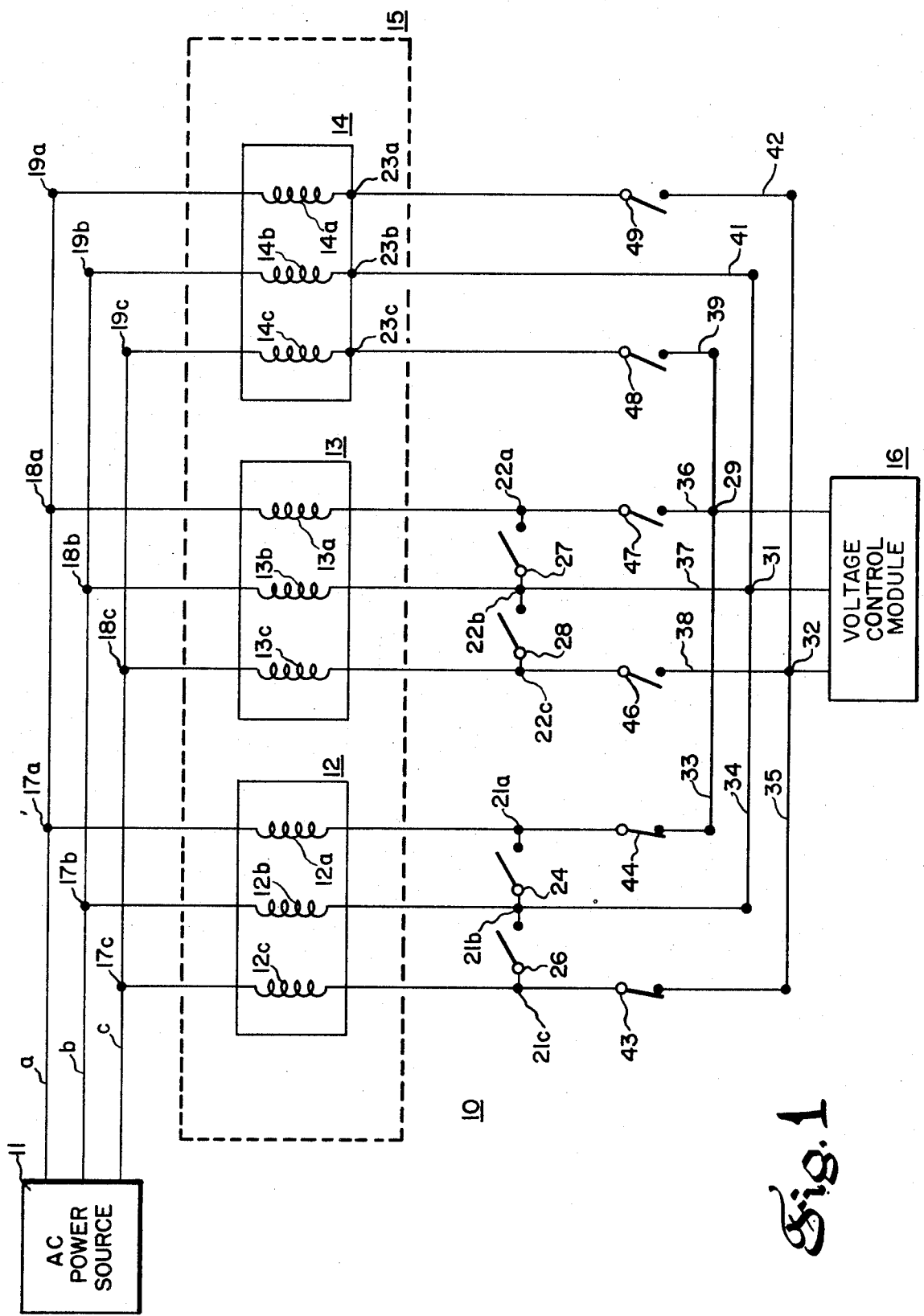
FIG. 1 is a schematic circuit diagram of a variable speed polyphase motor arrangement with sectional sequential switching and voltage control.

In the drawings as hereinafter described a preferred embodiment is depicted; however various other modifications can be made thereto without departing from the true spirit and scope of the invention.

DESCRIPTION OF THE PREFERRED EMBODIMENT

Reference is now made to FIG. 1 wherein the motor and control arrangement of the invention is indicated generally at 10. This invention is contemplated for use with induction motors and is particularly adapted for use with induction motors of the linear type. The preferred embodiment illustrates a "short stator" linear induction motor, wherein the stator 15 is moved along a linear rotor element (not shown) by relative electromagnetic reaction.

A polyphase power source 11 provides power to the motor stator sections 12, 13, and 14, with the voltage in any one section at a time being controlled by the voltage control module 16. The stator sections 12, 13, and 14 are sequentially energized to increase the total motor thrust available for attaining the desired motor speed.

The polyphase power source 11 shown in the preferred embodiment is of the three phase type and provides current to the lines a, b, and c, from which the stator windings of an induction motor are energized. Such a power source must necessarily be of the polyphase type or of the single phase type wherein the power supply is split into two separate coil groups with a phase difference being obtained by a method such as by inserting capacitance in series with one of the groups.

The power source may be stationary with the power delivery to the movable stator 15 being made by a wayside electric power pickup scheme, or the power source may be integral with the stator 15 of the motor such as with an arrangement of a prime mover and driven alternator being carried by the stator unit, or its associated vehicle. In either case, a constant voltage or base voltage is contemplated.

The stator 15 is made up of a plurality of electrically uncoupled stator sections arranged in a spaced linear relation. For illustration, FIG. 1 shows three sections 12, 13 and 14; however the actual number depends uniquely on the economics of the particular application. Each section is wound such that at full voltage it will develop that fraction of the total thrust requirement as the fraction that it bears to the total number of sections.

The sections 13, 14 and 15 each have alternate polyphase windings therein, 12a, 12b and 12c, 13a, 13b and 13c, and 14a, 14b, and 14c respectively, so as to form discrete operable stators with primary windings adapted to be energized by the power source 11 through lines a, b, and c. Each of the windings in sections 12, 13 and 14 is coupled with its appropriate phase lead a, b or c by the respective inlet terminals 17a, 17b and 17c, 18a, 18b and 18c, and 19a, 19b, and 19c, so that the sections 12, 13 and 14 are in electrically parallel relationship. Each of the windings also has control terminals, the respective terminals being indicated by the numbers 21a, 21b and 21c, 22a, 22b, and 22c, and 23a, 23b, and 23c, in FIG. 1.

A pair of shorting contactors is provided for each of the sections except one, to enable the control terminals thereof to be short circuited. In the preferred embodiment shorting contactors 24 and 26 are provided between the terminals 21a and 21b, and 21b and 21c respectively, while shorting contactors 27 and 28 are provided between the terminals 22a and 22b, and 22b and 22c, respectively. By closing either pair of shorting contactors the associated stator section can be energized and will have the full voltage of the power source 11 applied thereto to produce a thrust. Each section can thus be stepped into or out of the operating condition as the thrust demand is increased or decreased. Such stepping can be accomplished manually by an operator or may be achieved automatically by voltage responsive actuators (not shown) of the type commonly used in the art.

The controls terminals of each of the sections 12, 13 and 14 are coupled to the terminals 29, 31, and 32 respectively, by lines 33, 34 and 35, 36, 37, and 38, and 39, 41 and 42.

A pair of switches are provided, one in each of two lines, to open or close the circuits between each of the sections and the terminals 29, 31 and 32. The switches are indicated by the numerals 43 and 44, 46 and 47, and 48 and 49, respectively.

The voltage control module 16 is coupled to the three terminals 29, 31, and 32 and can be selectively coupled into or out of any one of the three circuits comprising the power source, a stator section and the voltage control module. The control module 16 is adapted to provide a smooth control of the voltage in the selected circuit by lower power level control of phase controlled rectifiers, such as is described in U.S. Pat. No. 3,582,737 hereinbefore referred to. The voltage control module need only have the current capacity of that existing in a single section, and therefore its components can be considerably reduced in size and expense from that which is required to control the voltage of a conventional induction motor arrangement. The capacity of the control module is dependent upon the number of stator sections which are used, the relationship being one of inverse proportion. Therefore, the greater the number of sections, the smaller the module required. However, this advantage is partially offset by the consequent requirement for additional switching equipment that is needed with each section. The closing and opening of the switches is accomplished in a similar manner as that of the shorting contactors hereinbefore described, and may be operated automatically in response to the torque requirement as indicated by the voltage level in any one section.

In operation the arrangement is utilized in the following manner. The first stator section 12 is energized by closing switches 43 and 44, while all other switches and shorting contacts remain open. The three-phase closed circuit then includes the power source, stator section 12 and the voltage control module, which module is utilized to smoothly and precisely increase the applied voltage to, and thus the torque output from, the section 12. As the stator speed is increased and the voltage is finally modulated to that of the power source, the shorting contacts 24 and 26 are closed to complete the section circuit and the switches 43 and 44 are opened to take the module out of the circuit. The stator section 12 is now producing its maximum torque and if greater torque is desired, section 13 may be energized. To do so, switches 46 and 47 are closed to complete the parallel circuit, wherein the voltage control module may be used to bring the section 13 to its maximum thrust output, whereupon, shorting contacts 27 and 28 are closed, switches 46 and 47 are opened and switches 48 and 49 are closed to energize section 14. The module 16 may then be employed to modulate the voltage of section 14 from zero to that of the power source i.e., the base voltage. Thus, precise smooth voltage control and hence, thrust control is provided over the entire speed range of the motor by the low power level control of the rectifiers of the module.

Figure 2:
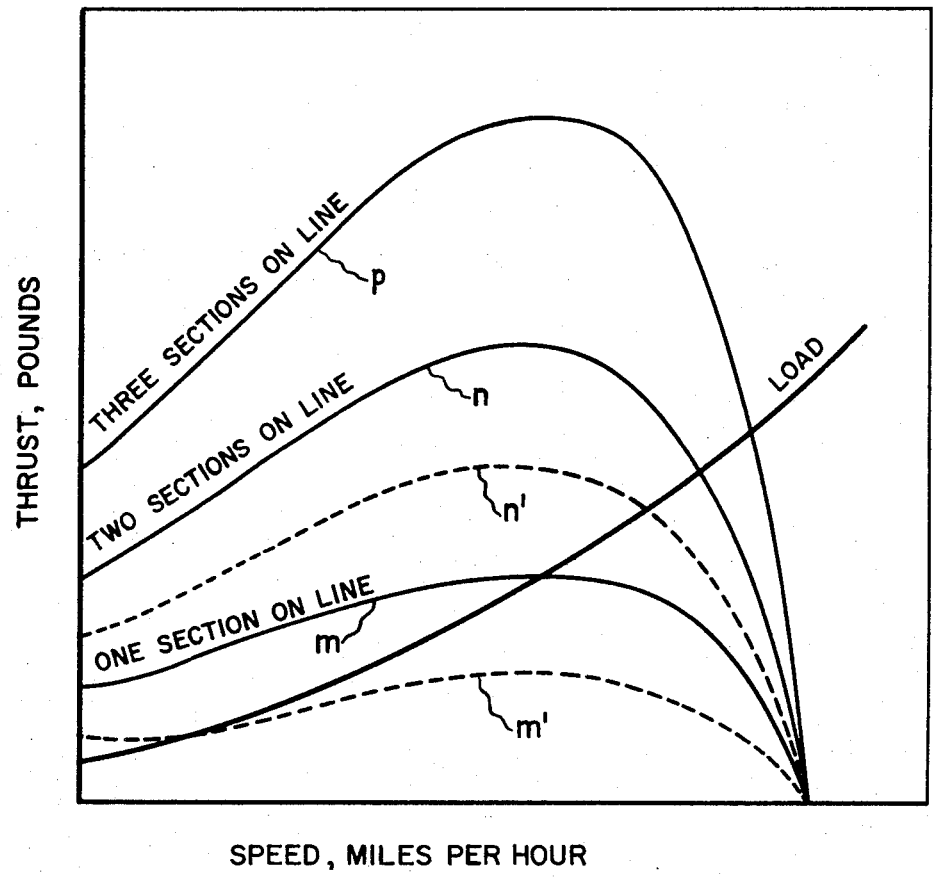
FIG. 2 is a representative graph illustrating thrust and speed relationship under various operational modes of a section linear induction motor.

Referring to FIG. 2, typical thrust values are indicated in relation to speed for an induction motor being energized in sections as described hereinabove. A curve of load values are also shown with relation to speed.

Curve *m* defines the thrust values produced by a single section (i.e. section 12), having the full line voltage applied thereto. In the operation of a single section the voltage control module 16 may be used to vary the voltage being applied thereto, and thus adjust the curve downwardly, as for example to *m*.

Similarly, the thrust values when two sections (i.e. 12 and 13) are connected to the full line voltage are indicated by the curve *n*. The characteristics between curves *m* and *n* (as for example *n*) can be obtained by having the first section 12 on full line voltage and the second section 13 coupled to the voltage control module for voltage modulation therein. Likewise, with the two sections (12 and 13) on full voltage the voltage control module can provide the torque characteristics between the curve *n* and the curve *p* which curve illustrates the characteristics of the motor having all three sections on full line voltage.

The voltage control module therefore provides a smooth and precise control of voltage and torque over a full range of vehicle speeds.

The effectiveness of the motor arrangement may be greatly enhanced by magnetically decoupling the stator sections to the degree practical. Linear motors lend themselves to this arrangement since the decoupling can be accomplished by physical separation of the sections. Even though the state of the art at present finds it difficult and impractical to apply this arrangement to rotary induction motors it should not be discounted as a possible future application.

What I claim as new and desire to secure by Letters Pat. of the United States:

1. A control system for regulating voltage applied to a variable speed linear induction motor energized by a polyphase AC power source of a given base voltage, the system comprising:
   a. a stator adapted to be moved linearly with respect to a rotor member by the ineraction of magnetic forces therebetween;
   b. said stator consisting of a plurality of electrically uncoupled sections arranged in a spaced linear relation, said sections having coils therein, each of said coils having inlet terminals and control terminals;
   c. means for independently and sequentially connecting in parallel relationship each of said plurality of sections to said AC power source, wherein said inlet terminals in each stator section are connected to alternate phases;
   d. voltage control means connectable to a plurality of said stator sections, one at a time, across the control terminals thereof, said voltage control means being adapted to vary the voltage being delivered to the stator section to which it is connected from zero magnitude to that of the base voltage;
   e. switching means connected to a plurality of said stator sections to couple the respective control terminals thereof and cause the base voltage to be applied across the stator bank; and
   f. switching means connected in each circuit between the voltage control means and each of said stator sections, said switching means being adapted to disconnect said voltage control means from the associated stator section.

2. A control system as defined in claim 1 wherein said voltage control means is of the phase controlled rectifier type.

3. A control system as defined in claim 1 wherein said plurality of stator sections are magnetically decoupled by physical separation.

4. A method for controlling thrust of a linear induction motor as the speed of the motor is increased the method comprising the following steps:
   a. electrically decoupling a plurality of stator sections arranged in a spaced linear relationship, each of said sections having a plurality of coils with inlet and control terminals respectively;
   b. connecting the inlet terminals of each of said plurality of stator banks in parallel configuration to associated phase legs of a polyphase AC power source of a predetermined voltage magnitude;
   c. coupling a voltage control means across the control terminals of a first of said stator sections so as to complete a circuit comprising said power source, said first stator section and said voltage control means;
   d. increasing the voltage across said first stator section from a zero value to said predetermined voltage magnitude;
   e. short circuiting the control terminals of said first of said stator sections so as to apply said predetermined voltage thereto;
   f. uncoupling said voltage control means from said first stator section control terminals;
   g. coupling said voltage control means across the control terminals of a second of said stator sections to complete a second circuit; comprising said power source, said second stator section and said voltage control means;
   h. increasing the voltage across said second of said stator sections from zero to said predetermined voltage magnitude;
   i. duplicating steps (e) thru (h) with the remaining stator sections to sequentially energize them until the desired thrust of the motor is attained.

5. A method for controlling thrust as defined in claim 4 wherein step (d) is accomplished by low-power controlling of phase controlled rectifiers.

6. A method for controlling thrust as defined in claim 4 and including a preliminary step of magnetically decoupling said plurality of stator sections by physical separation thereof.

* * * * *